US012112879B2

(12) United States Patent
Yoon et al.

(10) Patent No.: US 12,112,879 B2
(45) Date of Patent: Oct. 8, 2024

(54) COIL COMPONENT

(71) Applicant: SAMSUNG ELECTRO-MECHANICS CO., LTD., Suwon-si (KR)

(72) Inventors: Chan Yoon, Suwon-si (KR); Dong Hwan Lee, Suwon-si (KR); Dong Jin Lee, Suwon-si (KR); Sang Soo Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 692 days.

(21) Appl. No.: 17/116,094

(22) Filed: Dec. 9, 2020

(65) Prior Publication Data

US 2022/0093317 A1 Mar. 24, 2022

(30) Foreign Application Priority Data

Sep. 22, 2020 (KR) ........................ 10-2020-0122589

(51) Int. Cl.
*H01F 27/28* (2006.01)
*H01F 27/29* (2006.01)
*H01F 41/04* (2006.01)

(52) U.S. Cl.
CPC ......... *H01F 27/2804* (2013.01); *H01F 27/29* (2013.01); *H01F 41/041* (2013.01); *H01F 2027/2809* (2013.01)

(58) Field of Classification Search
CPC .... H01F 27/2804; H01F 27/29; H01F 41/041; H01F 2027/2809; H01F 2017/048; H01F 27/2852; H01F 27/292; H01F 5/00; H01F 5/04; H01F 27/28; H01F 17/04; H01F 27/02; H01F 27/2823; H01F 27/324; H01F 2017/002; H01F 2027/2819
See application file for complete search history.

(56) References Cited

U.S. PATENT DOCUMENTS

| | | | | |
|---|---|---|---|---|
| 6,140,902 A * | 10/2000 | Yamasawa | H01F 17/0006 336/200 |
| 2018/0096783 A1* | 4/2018 | Fukuda | H01F 27/366 |
| 2020/0168386 A1* | 5/2020 | Jung | H01F 27/255 |
| 2020/0279687 A1* | 9/2020 | Koo | H01F 17/04 |
| 2023/0058179 A1* | 2/2023 | Hongo | H02K 15/04 |
| 2023/0120688 A1* | 4/2023 | Kotani | H01F 27/24 336/200 |

FOREIGN PATENT DOCUMENTS

| | | |
|---|---|---|
| JP | 10-55916 A | 2/1998 |
| JP | 2005-142459 A | 6/2005 |
| JP | 2018-56505 A | 4/2018 |
| JP | 2019-140403 A | 8/2019 |

* cited by examiner

*Primary Examiner* — Malcolm Barnes
(74) *Attorney, Agent, or Firm* — MORGAN, LEWIS & BOCKIUS LLP

(57) ABSTRACT

A coil component includes a body, a coil portion disposed in the body, and first and second external electrodes disposed on the body to be spaced apart from each other, wherein A/C≥2.4 and B/C≥1.6 are satisfied, where a length, a width, and a thickness of the coil component are defined as ‘A’, ‘B’, and ‘C’, respectively, and a ratio of a thickness to a width of at least one turn of the coil portion is 1 or less, based on a cross-section of the coil component.

20 Claims, 5 Drawing Sheets

1000

COIL COMPONENT

CROSS-REFERENCE TO RELATED APPLICATION(S)

This application claims the benefit of priority to Korean Patent Application No. 10-2020-0122589, filed on Sep. 22, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in electronic devices, along with a resistor and a capacitor.

With higher performance and smaller sizes gradually implemented in electronic devices, the number of electronic components used in the electronic devices is increasing, and sizes of electronic components are being reduced. In particular, there is increasing demand for reducing thicknesses of electronic components.

SUMMARY

An aspect of the present disclosure is to provide a coil component having a reduced thickness.

Another aspect of the present disclosure is to provide a coil component for preventing a decrease in direct current resistance characteristic (Rdc).

According to an aspect of the present disclosure, a coil component includes a body, a coil portion disposed in the body, and first and second external electrodes disposed on the body to be spaced apart from each other, wherein $A/C \geq 2.4$ and $B/C \geq 1.6$ are satisfied, where a length, a width, and a thickness of the coil component are defined as 'A', 'B', and 'C', respectively, and a ratio of a thickness to a width of at least one turn of the coil portion is 1 or less, based on a cross-section of the coil component.

According to another aspect of the present disclosure, a coil component includes a body including a first end surface and a second end surface facing each other in a length direction, a first side surface and a second side surface facing each other in a width direction, and an upper surface and a lower surface facing each other in a thickness direction; a coil portion disposed in the body; and first and second external electrodes disposed on the first and second end surfaces of the body, respectively, and connected to the coil portion in the length direction. $A/C \geq 2.4$ and $B/C \geq 1.6$ are satisfied, where 'A' is a length of the coil component in the length direction, 'B' is a width of the coil component in the width direction, and 'C' is a thickness of the coil component in the thickness direction. A ratio of a thickness to a width of one turn of the coil portion is 1 or less, the thickness of the one turn being defined in the thickness direction of the body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
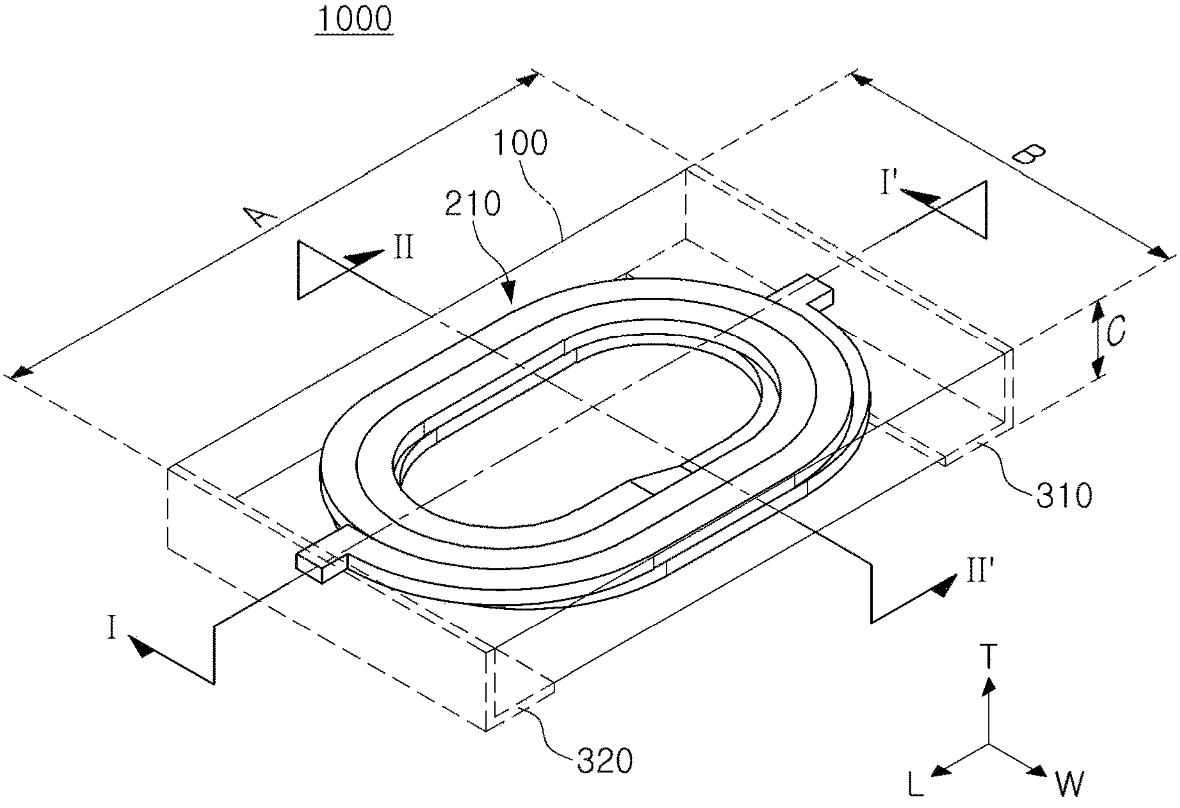
FIG. 1 is a view schematically illustrating a coil component according to an exemplary embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a gravity direction.

The term. "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, or the like.

Figure 2:
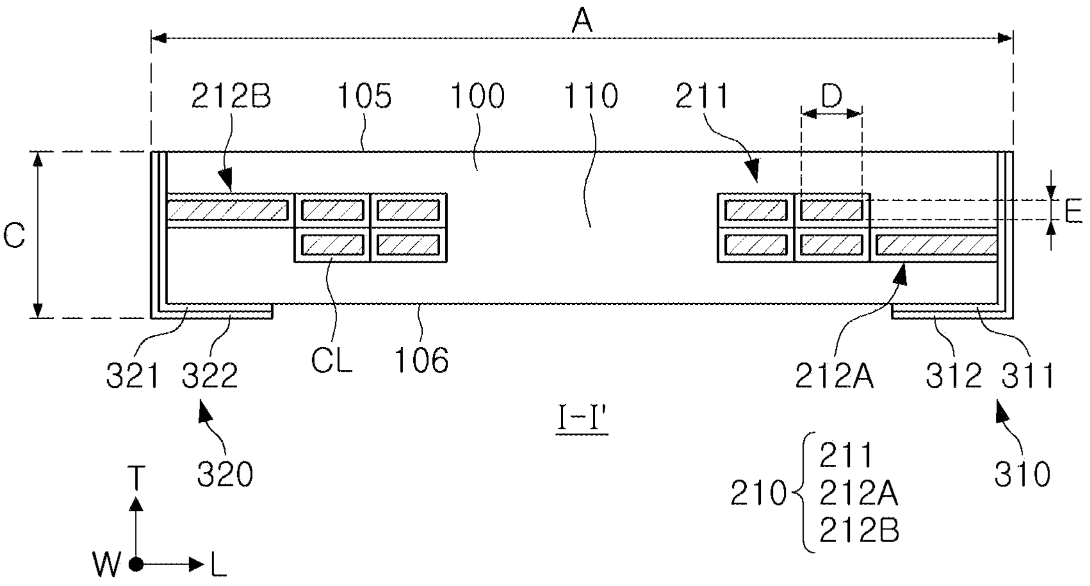
FIG. 2 is a cross-sectional view taken along line I-I' of FIG. 1.
Figure 3:
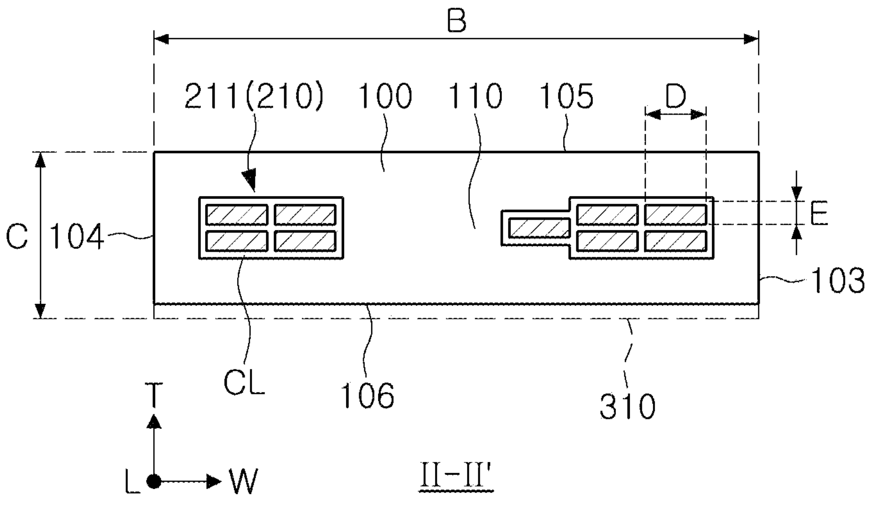
FIG. 3 is a cross-sectional view taken along line II-II' of FIG. 1.
Figure 4A:
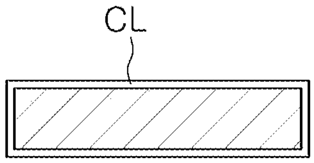
FIGS. 4A and 4B are views schematically illustrating cross-sections of each turn of a coil portion according to some exemplary embodiments of the present disclosure.
Figure 4B:
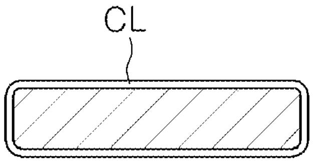

FIG. 1 is a view schematically illustrating a coil component according to an exemplary embodiment of the present disclosure. FIG. 2 is a cross-sectional view taken along line I-I' of FIG. 1. FIG. 3 is a cross-sectional view taken along line II-II' of FIG. 1. FIGS. 4A and 4B are views schematically illustrating cross-sections of each turn of a coil portion.

Referring to FIGS. 1 to 4, a coil component 1000 according to an exemplary embodiment of the present disclosure may include a body 100, a coil portion 210, and external electrodes 310 and 320.

The body 100 may form an exterior of the coil component 1000 according to this embodiment, and the coil portion 210 may be disposed therein.

The body 100 may be formed to have an overall hexahedral shape.

The body 100 may include a first surface 101 and a second surface 102 facing each other in a length direction L, a third surface 103 and a fourth surface 104 facing each other in a width direction W, and a fifth surface 105 and a sixth surface 106 facing each other in a thickness direction T. Each of the first to fourth surfaces 101, 102, 103, and 104 of the body 100 may correspond to wall surfaces of the body 100 connecting the fifth surface 105 and the sixth surface 106 of the body 100. Hereinafter, both end surfaces (a first end surface and a second end surface) of the body 100 may refer to the first surface 101 and the second surface 102 of the body 100, both side surfaces (a first side surface and a second side surface) of the body 100 may refer to the third surface 103 and the fourth surface 104 of the body 100, and a lower surface and an upper surface of the body 100 may refer to the sixth surface 106 and the fifth surface 105 of the body 100.

The body 100 may be formed such that the coil component 1000 according to this embodiment in which the external electrodes 310 and 320 to be described later are formed has a length (A) of 3.2 mm, a width (B) of 2.5 mm, and a thickness (C) of 0.5 mm, a length (A) of 2.5 mm, a width (B) of 2 mm, and a thickness (C) of 0.5 mm, a length (A) of 2 mm, a width (B) of 1.2 mm, and a thickness (C) of 0.5 mm, a length (A) of 1.6 mm, a width (B) of 0.8 mm, and a thickness (C) of 0.5 mm, or a length (A) of 1.2 mm, a width (B) of 1 mm, and a thickness (C) of 0.5 mm, but the present disclosure is not limited thereto.

In this case, the length (A) of the coil component 1000 may refer to a maximum value, among distances of a plurality of line segments, connecting two boundary lines opposed in the length direction L and parallel to the length direction L, among outermost boundary lines of the coil component 1000 illustrated in an optical micrograph of the coil component 1000 taken from a view facing the fifth surface 105 of the body 100, based on the optical micrograph. Alternatively, the length (A) of the coil component 1000 may refer to a minimum value, among distances of a plurality of line segments, connecting two boundary lines opposed in the length direction L and parallel to the length direction L, among outermost boundary lines of the coil component 1000 illustrated in the optical micrograph, based on the optical micrograph. Alternatively, the length (A) of the coil component 1000 may refer to an arithmetic average value of at least three or more distances, among distances of a plurality of line segments, connecting two boundary lines opposed in the length direction L and parallel to the length direction L, among outermost boundary lines of the coil component 1000 illustrated in the optical micrograph, based on the optical micrograph.

In this case, the width (B) of the coil component 1000 may refer to a maximum value, among distances of a plurality of line segments, connecting two boundary lines opposed in the width direction W and parallel to the width direction W, among outermost boundary lines of the coil component 1000 illustrated in an optical micrograph of the coil component

1000 taken from a view facing the fifth surface 105 of the body 100, based on the optical micrograph. Alternatively, the width (B) of the coil component 1000 may refer to a minimum value, among distances of a plurality of line segments, connecting two boundary lines opposed in the width direction W and parallel to the width direction W, among outermost boundary lines of the coil component 1000 illustrated in the optical micrograph, based on the optical micrograph. Alternatively, the width (B) of the coil component 1000 may refer to an arithmetic average value of at least three or more distances, among distances of a plurality of line segments, connecting two boundary lines opposed in the width direction W and parallel to the width direction W, among outermost boundary lines of the coil component 1000 illustrated in the optical micrograph, based on the optical micrograph.

In this case, the thickness (C) of the coil component 1000 may refer to a maximum value, among distances of a plurality of line segments, connecting two boundary lines opposed in the thickness direction T and parallel to the thickness direction T, among outermost boundary lines of the coil component 1000 illustrated in an optical micrograph of the coil component 1000 taken from a view facing the first surface 101 of the body 100, based on the optical micrograph. Alternatively, the thickness (C) of the coil component 1000 may refer to a minimum value, among distances of a plurality of line segments, connecting two boundary lines opposed in the thickness direction T and parallel to the thickness direction T, among outermost boundary lines of the coil component 1000 illustrated in the optical micrograph, based on the optical micrograph. Alternatively, the thickness (C) of the coil component 1000 may refer to an arithmetic average value of at least three or more distances, among distances of a plurality of line segments, connecting two boundary lines opposed in the thickness direction T and parallel to the thickness direction T, among outermost boundary lines of the coil component 1000 illustrated in the optical micrograph, based on the optical micrograph.

Alternatively, the length (A), the width (B), and the thickness (C) of the coil component 1000 may be measured by a micrometer measurement method. The micrometer measurement method may be measured by setting a zero point with a micrometer with gage repeatability and reproducibility (R&R), inserting a coil component 1000 according to this embodiment between the tips of the micrometer, and turning a measuring lever of the micrometer lever. In measuring a length (A) of the coil component 1000 by the micrometer measurement method, the length (A) of the coil component 1000 may refer to a value measured once, and may refer to an arithmetic average value of values measured multiple times. This may equally be applied to the width (B) and the thickness (c) of the coil component 1000.

The length (A) of the coil component 1000 may be 1.2 mm or more and 3.2 mm or less. The width (B) of the coil component 1000 may be 0.8 mm or more and 2.5 mm or less. The thickness (C) of the coil component 1000 may be 0.5 mm or less. When the length (A) of the coil component 1000 is less than 1.2 mm or the width (B) of the coil component 1000 is less than 0.8 mm, the length (A) and width (B) of the coil component 1000 according to this embodiment may become small to increase defects. In addition, since a cross-sectional area of the body 100 in the length direction L-width direction W is relatively small, it may be difficult to secure a magnetic path. When the length (A) of the coil component 1000 exceeds 3.2 mm, or the width (B) of the coil component 1000 exceeds 2.5 mm, it may be disadvantageous for downsizing components. When the thickness (C) of the coil component 1000 exceeds 0.5 mm, it may be disadvantageous for thinning components.

The length (A), the width (B), and the thickness (C) of the coil component 1000 may satisfy A/C≥2.4 and B/C≥1.6, which will be described later.

The body 100 may include a magnetic material and a resin. Specifically, the body 100 may be formed by stacking one or more magnetic composite sheets including a resin and a magnetic material dispersed in the resin. The body 100 may have a structure other than the structure in which the magnetic material may be dispersed in the resin. For example, the body 100 may be made of a magnetic material such as ferrite.

The magnetic material may be a ferrite powder particle or a metal magnetic powder particle.

Examples of the ferrite powder particle may include one or more of spinel type ferrite grains such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrite grains such as Ba—Zn-based ferrite, Ba—Mg-based ferrite, Ba—Ni-based ferrite, Ba—Co-based ferrite, Ba—Ni—Co-based ferrite, and the like, garnet type ferrite grains such as Y-based ferrite, and the like, and Li-based ferrite grains.

The metal magnetic powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particle may be one or more of pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metal magnetic powder particle may be amorphous or crystalline. For example, the metal magnetic powder particle may be a Fe—Si—B—Cr-based amorphous alloy powder particle, but is not limited thereto.

The metal magnetic powder particle may have an average diameter of about 0.1 μm to 30 μm, respectively, but are not limited thereto.

The body 100 may include two or more types of magnetic materials dispersed in the resin. In this case, the term "different types of magnetic materials" means that magnetic materials dispersed in a resin are distinguishable from each other by at least one of an average diameter, a composition, a crystallinity, and a shape.

The resin may include an epoxy, a polyimide, a liquid crystal polymer, or the like, in a single form or in combined form, but is not limited thereto.

The body 100 may include a core 110 passing through a central portion of a winding portion 211 of the coil portion 210, to be described later. The core 110 may be formed by filling the central portion of the winding portion 211 with the magnetic composite sheet, but is not limited thereto.

The coil portion 210 may be disposed in the body 100 to express characteristics of a coil component. For example, when the coil component 1000 of this embodiment is used as a power inductor, the coil portion 210 may store an electric field as a magnetic field and may maintain an output voltage, to stabilize power of an electronic device. In this embodiment, since the coil portion 210 may be a winding coil wound around a metal wire such as a copper wire (Cu-wire), including a conductive wire portion and a coating layer CL covering a surface of the conductive wire portion, the coil portion 210 and the winding coil 210 may be used to have the same meaning, in the following description of this embodiment. The coating layer CL may include, but not limited to, an insulating material such as epoxy, polyimide, liquid crystal polymer, or the like, alone or as a mixture.

Referring to FIGS. 4A and 4B, a metal wire may have a rectangular cross-section (FIG. 4A) with corners each having a substantially right angle, or a rectangular cross-section with rounded corners (FIG. 4B). In the above-described examples, since the metal wire includes a region having a substantially flat side surface, ease of operation may be improved when a winding coil 210 is formed with the metal wire.

The winding coil 210 may be a winding portion 211 having an air-core coil-shape, and lead-out portions 212A and 212B extending from both ends of the winding portion 211 and exposed from the first and second surfaces 101 and 102 of the body 100, respectively. The winding portion 211 may refer to a portion having a ring shape as a whole in which at least one turn is formed around the core 110.

The winding portion 211 may be formed by winding a metal wire in a spiral shape. As a result, all turns of the winding portion 211 may have a form covered with the coating layer CL. The winding portion 211 may be formed of at least one layer. Each layer in the winding portion 211 may be formed to have a planar spiral shape, and may have at least one turn.

The coating layers CL of adjacent turns of the winding portion 211 may be in contact with each other. After winding the metal wire, the winding coil 210 may be heated and pressurized. In this case, the coating layers CL disposed on each of the adjacent turns may come into contact with each other. Therefore, a spaced space between turns may be filled with the coating layer CL. As illustrated in FIG. 2, the coating layers CL disposed in the spaced space between turns may form a boundary therebetween. Alternatively, as illustrated in FIG. 3, the coating layers CL disposed in the spaced space between turns may not have a boundary formed therebetween. In the latter case, in the heating and pressing process described above, at least a portion of the coating layer CL may be melted and fused to each other. The coating layer CL may be formed of a plurality of layers, such as, for example, including an insulating coating layer and a fusion layer. In this case, no boundary being formed between coating layers CL disposed in a spaced space between turns may refer to a fusion layer not forming a boundary therein among the coating layers CL disposed in the spaced space between the turns.

The first lead-out portion 212A may be connected to one end of the winding portion 211 and exposed from the first surface 101 of the body 100. The second lead-out portion 212B may be connected to the other end of the winding portion 211 and exposed from the second surface 102 of the body 100. Since the winding coil 210 is formed by winding a metal wire, the winding portion 211 and the lead-out portions 212A and 212B may be integrally formed without forming a boundary therebetween. Surfaces of the lead-out portions 212A and 212B may be also covered by the coating layer CL. When one region of the surfaces of the lead-out portions 212A and 212B is exposed from the first and second surfaces 101 and 102 of the body 100, respectively, the coating layer CL of the one region may be removed for electrical connection with the external electrodes 310 and 320 to be described later.

At least one turn of the coil portion 210 may satisfy a ratio of a thickness (E) to a width (D) of 1 or less, based on a cross-section of the coil component 1000. As an example, referring to FIG. 2, based on a cross-section of the coil component 1000 in the length direction L-thickness direction T, each turn of the winding portion 211 may satisfy a ratio of a distance in the thickness direction T (a thickness of the turn, E) to a distance in the length direction L (a width of the turn, D), of 1 or less. As another example, referring to FIG. 3, based on a cross-section of the coil component 1000 in the width direction W-thickness direction T, each turn of the winding portion 211 may satisfy a ratio of a distance in the thickness direction T (a thickness of the turn, E) to a distance in the width direction W (a width of the turn, D), of 1 or less. The ratio of the distance in the thickness direction T to the distance in the width direction W of the turn may be defined as an aspect ratio (AR). In this embodiment, an aspect ratio (AR) of the turn may be formed to be 1 or less to secure sufficient thicknesses of cover portions respectively disposed above and below the winding coil 210 of the body 100, while reducing the overall thickness (C) of the coil component 1000. Therefore, it is possible to smooth flow of magnetic flux while reducing a thickness of the coil component 1000. The aspect ratio (AR) of each turn of the coil portion 210 may be, for example, 0.3 or more and 1 or less, but the scope of the present disclosure is not limited thereto. In the present specification, the width (D) of the turn and the thickness (E) of the turn may be calculated in a similar manner to the measurement methods of the length (A), the width (B), and the thickness (C) of the coil component described above. As an example, the width (D) of the turns of the coil portion 210 may refer to a maximum value, among distances of a plurality of line segments, a minimum value, among distances of a plurality of line segments, or an arithmetic average value of at least three or more distances, connecting two boundary lines opposed in the length direction L of any one turn and parallel to the length direction L, illustrated in an optical micrograph of the LT cross-section of the coil component 1000, based on the optical micrograph. As another example, the width (D) of the turns of the coil portion 210 may refer to an arithmetic average value of the widths of the turns, measured for each of at least two or more turns (where, the widths of the turns may be calculated by any one of the three methods described above), based on an optical micrograph of the LT cross-section of the coil component 1000.

The external electrodes 310 and 320 may be disposed in the body 100 to be spaced apart from each other, and may be connected to the coil portion 210. Specifically, the first external electrode 310 may be disposed on the first surface 101 of the body 100 and may be in contact with the first lead-out portion 212A exposed from the first surface 101 of the body 100. The second external electrode 320 may be disposed on the second surface 102 of the body 100 and may be in contact with the second lead-out portion 212B exposed from the second surface 102 of the body 100. The first external electrode 310 may cover at least a portion of the first surface 101 of the body 100, and at least a portion of the first external electrode 310 may extend onto the sixth surface 106 of the body 100. The second external electrode 320 may cover at least a portion of the second surface 102 of the body 100, and at least a portion of the second external electrode 320 may extend onto the sixth surface 106 of the body 100. On the sixth surface 106 of the body 100, the first and second external electrodes 310 and 320 may be disposed to be spaced apart from each other. For example, each of the external electrodes 310 and 320 may be formed to have an L shape in overall.

The external electrodes 310 and 320 may be formed by a vapor deposition method such as sputtering and/or a plating method, but are not limited thereto, and may be formed by applying and curing a conductive resin including a conductive powder particle such as copper (Cu) and/or silver (Ag), and an insulating resin, on a surface of the body 100.

The external electrodes 310 and 320 may be formed of a conductive material such as copper (Cu), aluminum (Al), silver (Ag), tin (Sn), gold (Au), nickel (Ni), lead (Pb), chromium (Cr), titanium (Ti), alloys thereof, or the like, but are not limited thereto. The external electrodes 310 and 320 may be formed to have a single layer or multilayer structure. For example, the external electrodes 310 and 320 may include first electrode layers 311 and 321 contacting the body 100, and second electrode layers 312 and 322 disposed on the first electrode layers 311 and 321. The first electrode layers 311 and 321 may be, for example, a conductive resin including a conductive powder such as copper (Cu) and/or silver (Ag), and an insulating resin, or may be a copper plating layer. The second electrode layers 312 and 322 may be a nickel plated layer plated on the first electrode layers 311 and 321, or may be a nickel plated layer, and a tin plated layer disposed on the nickel plated layer.

For example, a thickness (a dimension in the L direction, based on FIG. 2) of each of the external electrodes 310 and 320 disposed on the first and second surfaces 101 and 102 of the body 100 may be 30 μm, and a thickness (a dimension in the T direction, based on FIG. 2) of each of the external electrodes 310 and 320 disposed on the sixth surface 106 of the body 100 may be 20 μm, but a scope of the present disclosure is not limited thereto.

Table 1 illustrates values obtained by measuring inductance and direct current resistance (Rdc) of Samples 1 to 27, depending on a length (A), a width (B), and a thickness (C) of a coil component 1000, ratio A/C, B/C, and a ratio (AR) of a thickness (E) to a width (D) of a turn of a coil portion 210.

Except for A, B, C, and AR, remaining variables in Samples 1 to 27 were the same. For example, in Samples 1 to 27, each of the first and second external electrodes had an L-shaped shape, all distances of the external electrodes in the L direction disposed on the first and second surfaces 101 and 102 of the body 100 were the same, and all distances of the external electrodes in the T direction disposed on the sixth surface 106 of the body 100 were the same. In addition, frequencies for measuring inductance of Samples 1 to 27 were 1 MHz, which were the same.

TABLE 1

| | A [mm] | B [mm] | C [mm] | A/C | B/C | AR | Inductance [uH] | Rdc [mOhm] |
|---|---|---|---|---|---|---|---|---|
| 1 | 3.2 | 2.5 | 0.5 | 6.4 | 5 | 0.6 | 0.47 | 25.67 |
| 2 | | | | | | 1 | 0.47 | 26.32 |
| 3 | | | | | | 1.2 | 0.469 | 29.2 |
| 4 | 2.5 | 2 | 0.5 | 5 | 4 | 0.64 | 0.471 | 30.5 |
| 5 | | | | | | 1 | 0.47 | 31.52 |
| 6 | | | | | | 1.2 | 0.47 | 33.78 |
| 7 | 2 | 1.6 | 0.5 | 4 | 3.2 | 0.7 | 0.471 | 50.12 |
| 8 | | | | | | 1 | 0.47 | 51.24 |
| 9 | | | | | | 1.3 | 0.471 | 53.2 |
| 10 | 2 | 1.2 | 0.5 | 4 | 2.4 | 0.72 | 0.468 | 68.45 |
| 11 | | | | | | 1 | 0.469 | 69.47 |
| 12 | | | | | | 1.7 | 0.469 | 70.83 |
| 13 | 1.6 | 0.8 | 0.5 | 3.2 | 1.6 | 0.83 | 0.47 | 75.65 |
| 14 | | | | | | 1 | 0.471 | 77.03 |
| 15 | | | | | | 2 | 0.472 | 78.64 |

TABLE 1-continued

| | A [mm] | B [mm] | C [mm] | A/C | B/C | AR | Inductance [uH] | Rdc [mOhm] |
|---|---|---|---|---|---|---|---|---|
| 16 | 1.2 | 1 | 0.5 | 2.4 | 2 | 0.88 | 0.469 | 73.81 |
| 17 | | | | | | 1 | 0.47 | 74.94 |
| 18 | | | | | | 2.1 | 0.47 | 76.57 |
| 19 | 1 | 0.5 | 0.5 | 2 | 1 | 0.9 | 0.47 | 160.41 |
| 20 | | | | | | 1 | 0.47 | 156.4 |
| 21 | | | | | | 2.5 | 0.471 | 152.49 |
| 22 | 0.8 | 0.5 | 0.5 | 1.6 | 1 | 0.92 | 0.471 | 286.41 |
| 23 | | | | | | 1 | 0.471 | 267.45 |
| 24 | | | | | | 3 | 0.471 | 260.8 |
| 25 | 0.6 | 0.3 | 0.5 | 1.2 | 0.6 | 0.95 | 0.472 | 521.57 |
| 26 | | | | | | 1 | 0.471 | 500.32 |
| 27 | | | | | | 3.4 | 0.471 | 481.62 |

Comparing Samples 1 to 18 and Samples 19 to 27, it can be seen that DC resistance (Rdc) of Samples 19 to 27 not satisfying the A/C range or the B/C range of the present disclosure were greater than that of Samples 1 to 18 satisfying the A/C range and the B/C range of the present disclosure. For example, DC resistance (Rdc) characteristics of Samples 19 to 27 were inferior to DC resistance (Rdc) characteristics of Samples 1 to 18.

Samples 3, 6, 9, 12, 15, and 18 satisfied the A/C range and the B/C range of the present disclosure, but exceeded a ratio (AR) of a thickness of a turn to a width (D) of the turn. Comparing these Samples and Samples having the same A/C and B/C values, it can be seen that the direct current resistance Rdc have relatively increased. For example, direct current resistance (Rdc) characteristics of samples 3, 6, 9, 12, 15, and 18 were inferior.

As a result, it can be seen that Samples 1, 2, 4, 5, 7, 8, 10, 11, 13, 14, 16, and 17, satisfying $A/C \geq 2.4$ and $B/C \geq 1.6$ and having an aspect ratio (AR) of 1 or less, may secure DC resistance (Rdc) characteristic of a coil component while forming an aspect ratio (AR) to 1 or less.

Figure 5:
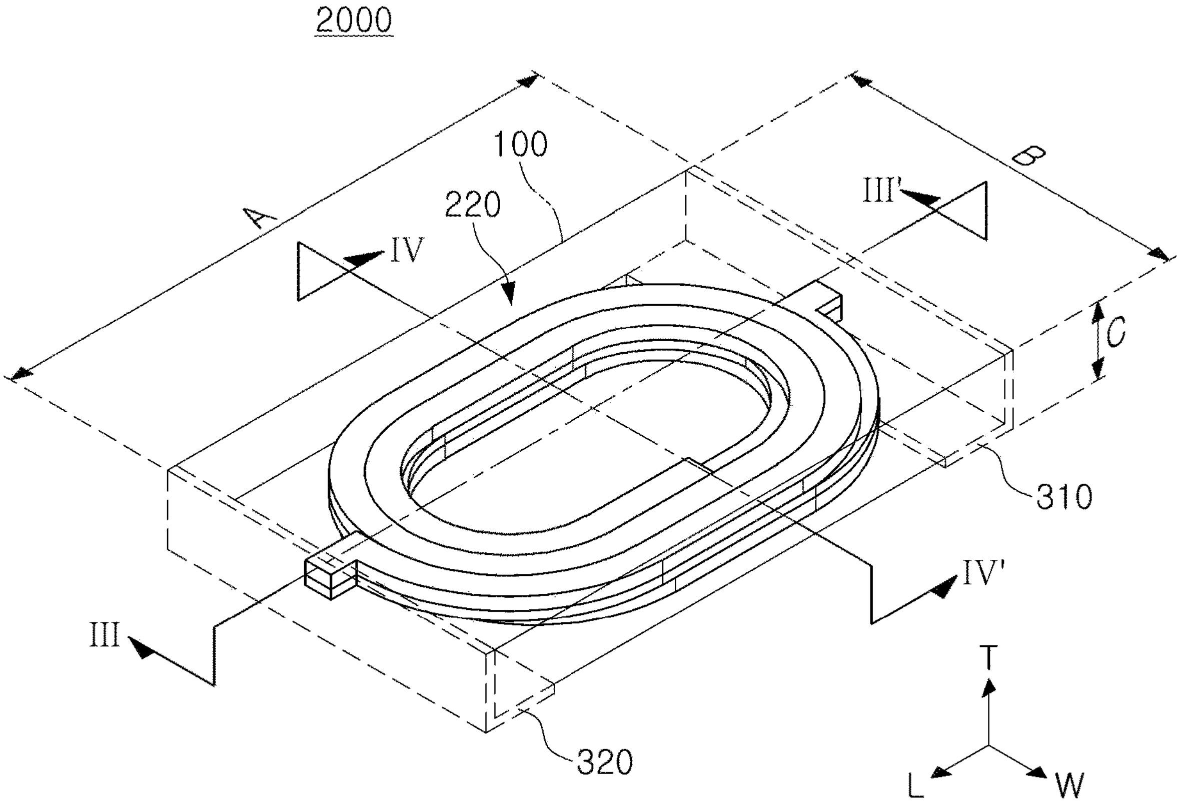
FIG. 5 is a view schematically illustrating a coil component according to another exemplary embodiment of the present disclosure.
Figure 6:
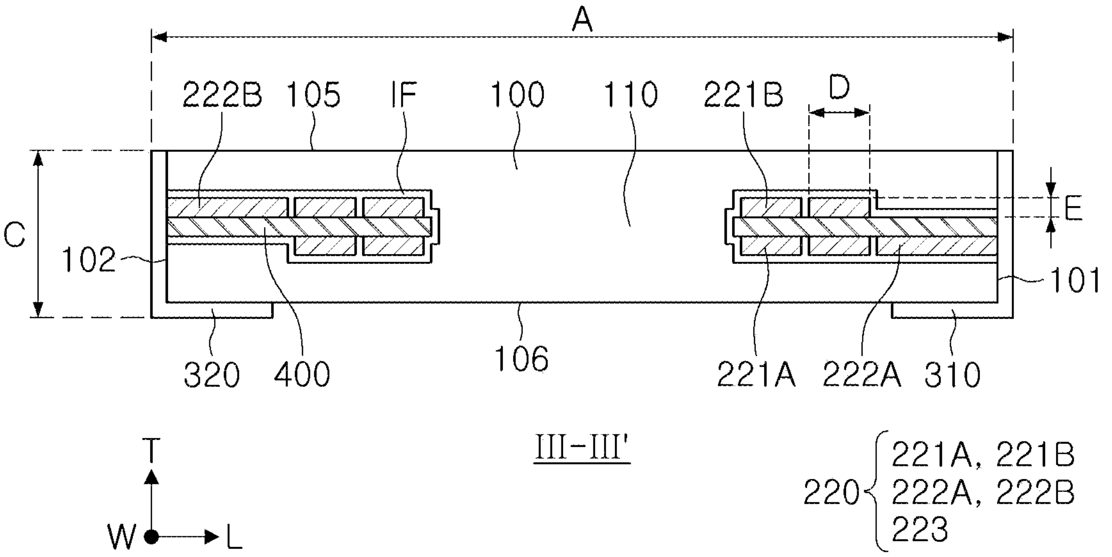
FIG. 6 is a cross-sectional view taken along line III-III' of FIG. 5.
Figure 7:
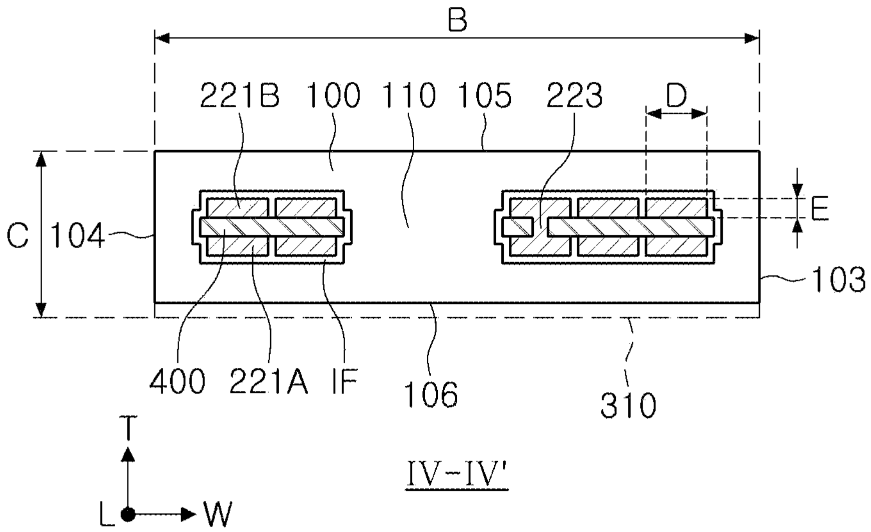
FIG. 7 is a cross-sectional view taken along line IV-IV' of FIG. 5.

FIG. 5 is a view schematically illustrating a coil component according to another exemplary embodiment of the present disclosure. FIG. 6 is a cross-sectional view taken along line III-III' of FIG. 5. FIG. 7 is a cross-sectional view taken along line IV-IV' of FIG. 5.

Referring to FIGS. 1 to 4, and FIGS. 5 to 7, a coil component 2000 according to this embodiment may have a different internal structure, as compared to the coil component 1000 according to the first embodiment of the present disclosure. Therefore, in the following description of this embodiment, an internal structure of the body 100, different from that of the first embodiment of the present disclosure, will mainly be described. For remaining configurations of this embodiment, the description in the first embodiment of the present disclosure may be applied equally.

Referring to FIGS. 5 to 7, a coil component 2000 according to this embodiment may further include a support substrate 400 and an insulating film IF. In addition, a coil portion 220 may include coil patterns 221A and 221B, lead-out patterns 222A and 222B, and vias 223.

The support substrate 400 may be disposed in the body 100 to support the coil portion 220.

The support substrate 400 may be formed of an insulating material including a thermosetting insulating resin such as an epoxy resin, a thermoplastic insulating resin such as polyimide, or a photosensitive insulating resin, or may be formed of an insulating material in which a reinforcing material such as a glass fiber or an inorganic filler is impregnated with such an insulating resin. For example, the support substrate 400 may be formed of an insulating material such as prepreg, Ajinomoto Build-up Film (ABF), FR-4, a bismaleimide triazine (BT) resin, a photoimageable dielectric (PID), and the like, but are not limited thereto.

As the inorganic filler, one or more selected from a group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 400 is formed of an insulating material including a reinforcing material, the support substrate 400 may provide better rigidity. When the support substrate 400 is formed of an insulating material not containing glass fibers, the support substrate 400 may be advantageous for reducing a thickness (C) of the coil component 2000 according to this embodiment. In addition, a volume occupied by the coil portion 220 and/or the magnetic material may be increased based on the body 100 of the same size, to improve characteristics of components. When the support substrate 400 is formed of an insulating material containing a photosensitive insulating resin, the number of processes for forming the coil portion 220 may be reduced. Therefore, it may be advantageous in reducing production costs, and a fine via may be formed.

The coil portion 220 may include coil patterns 221A and 221B, lead-out patterns 222A and 222B, and a via 223. Specifically, based on the directions of FIGS. 5 to 7, a first coil pattern 221A may be disposed on a lower surface of the support substrate 400 opposing the sixth surface 106 of the body 100, and a second coil pattern 221B may be disposed on an upper surface of the support substrate 400 opposing the lower surface of the support substrate 400. A first lead-out pattern 222A may be disposed on the lower surface of the support substrate 400, may be connected to contact the first coil pattern 221A, and may be exposed from the first surface 101 of the body 100. A second lead-out pattern 222B may be disposed on the upper surface of the support substrate 400, may be connected to contact the second coil pattern 221B, and may be exposed from the second surface 102 of the body 100. The via 223 may pass through the support substrate 400 to connect innermost end portions of the first and second coil patterns 221A and 221B to each other. By doing this, the coil portion 220 may function as a single coil as a whole.

Each of the coil patterns 221A and 221B may have a planar spiral shape in which at least one turn is formed around the core 110. For example, the first coil pattern 221A may have a planar spiral shape in which at least one turn is formed around the core 110 on the lower surface of the support substrate 400.

At least one of the coil patterns 221A and 221B, the lead-out patterns 222A and 222B, and the via 223 may include one or more conductive layers. For example, when the second coil pattern 221B, the second lead-out pattern 222B, and the via 223 is formed by plating on the upper surface of the support substrate 400, the second coil pattern 221B, the second lead-out pattern 222B, and the via 223 may include a seed layer and an electroplating layer, respectively. In this case, the electroplating layer may have a single-layer structure or a multilayer structure. The electroplating layer of the multilayer structure may be formed by a conformal film structure in which one electroplating layer is covered by the other electroplating layer, or may have a form in which the other electroplating layer is stacked on only one surface of the one electroplating layer. The seed layer may be formed by a vapor deposition method such as an electroless plating process, a sputtering process, or the like. The seed layer of each of the second coil pattern 221B, the second lead-out pattern 222B, and the via 223 may be integrally formed, no boundary therebetween may occur, but are not limited thereto. The electroplating layer of each of the second coil pattern 221B, the second lead-out pattern 222B, and the via 223 may be integrally formed, no boundary therebetween may occur, but are not limited thereto.

The coil patterns 221A and 221B may be formed to protrude from the lower and upper surfaces of the support substrate 400, respectively, as illustrated in FIGS. 6 and 7, for example. As another example, the first coil pattern 221A may protrude from the lower surface of the support substrate 400, and the second coil pattern 221B may be embedded in the upper surface of the support substrate 400, to expose an upper surface of the second coil pattern 221B from the upper surface of the support substrate 400. In this case, since a concave portion may be formed on the upper surface of the second coil pattern 221B, the upper surface of the support substrate 400 and the upper surface of the second coil pattern 221B may not be located on the same plane.

Each of the coil patterns 221A and 221B, the lead-out patterns 222A and 222B, and the via 223 may be formed of a conductive material such as copper (Cu), aluminum (Al), silver (Ag), tin (Sn), gold (Au), nickel (Ni), lead (Pb), titanium (Ti), or alloys thereof, but are not limited thereto.

An insulating film IF may be disposed between the coil portion 220 and the body 100, and between the support substrate 400 and the body 100. The insulating layer IF may be formed along surfaces of the support substrate 400 and the coil portion 220, but may be not limited thereto. The insulating layer IF may be for insulating the coil portion 220 and the body 100, and may include a known insulating material such as parylene, but is not limited thereto. As another example, the insulating layer IF may include an insulating material such as an epoxy resin, other than parylene. The insulating layer IF may be formed by a vapor deposition method, but is not limited thereto. As another example, the insulating film IF may be formed by stacking and curing an insulating film for forming the insulating film IF on both surfaces of the support substrate 400 on which the coil portion 220 is formed, or may be formed by applying and curing an insulating paste for forming an insulating film IF on both surfaces of the support substrate 400 on which the coil portion 220 is formed.

According to an embodiment of the present disclosure, an overall thickness of a coil component can be reduced.

According to an embodiment of the present disclosure, a decrease in direct current resistance characteristics (Rdc) can be prevented.

While exemplary embodiments have been illustrated and described above, it will be apparent to those skilled in the art that modifications and variations could be made without departing from the scope of the present disclosure as defined by the appended claims.

What is claimed is:

1. A coil component, comprising a body, a coil portion disposed in the body, and first and second external electrodes disposed on the body to be spaced apart from each other, wherein $2.4 \geq A/C \geq 6.4$ and $1.6 \geq B/C \geq 5.0$ are satisfied, where a length, a width, and a thickness of the coil component are defined as 'A', 'B', and 'C', respectively, the thickness (C) of the coil component being defined as a distance from a lowermost surface of the first and second external electrodes to an upper surface of the body, and a ratio of a thickness to a width of at least one turn of the coil portion is 1 or less, based on a cross-section of the coil component.

2. The coil component of claim 1, wherein the length (A) of the coil component is 1.2 mm or more and 3.2 mm or less.

3. The coil component of claim 1, wherein the width (B) of the coil component is 0.8 mm or more and 2.5 mm or less.

4. The coil component of claim 1, wherein the thickness (C) of the coil component is 0.5 mm.

5. The coil component of claim 1, further comprising a coating layer disposed on the coil portion and covering a surface of each turn of the coil portion.

6. The coil component of claim 5, wherein coating layers in adjacent turns of the coil portion are in contact with each other, respectively.

7. The coil component of claim 5, wherein the coil portion is formed by winding a metal wire comprising a conductive wire portion and the coating layer coating a surface of the conductive wire portion.

8. The coil component of claim 5, wherein coating layers in all adjacent turns of the coil portion stacked in a thickness direction of the coil component are in contact with each other, respectively.

9. The coil component of claim 1, further comprising a support substrate disposed in the body to support the coil portion, wherein the coil portion comprises:

first and second coil patterns disposed on a first surface and a second surface of the support substrate, opposing each other, first and second lead-out patterns extending from the first and second coil patterns, respectively, and exposed to surfaces of the body, and a via passing through the support substrate and connecting innermost ends of the first and second coil patterns to each other.

10. The coil component of claim 9, further comprising an insulating film disposed between each of the coil portion and the body and between the support substrate and the body.

11. The coil component of claim 1, wherein the body has a lower surface, and a first end surface and a second end surface respectively connected to the lower surface and opposing each other in a length direction, wherein the first external electrode is disposed on the first end surface of the body, and extends to be disposed on the lower surface of the body, and the second external electrode is disposed on the second end surface of the body, and extends to be disposed on the lower surface of the body.

12. The coil component of claim 11, wherein the first and second external electrodes comprise first electrode layers contacting the body and second electrode layers disposed on the first electrode layers, respectively.

13. The coil component of claim 1, wherein the body includes a first end surface and a second end surface facing each other in a length direction, a first side surface and a second side surface facing each other in a width direction, and an upper surface and a lower surface facing each other in a thickness direction, and the first and second end surfaces and the first and second side surfaces correspond to wall surfaces of the body connecting the upper and lower surfaces.

14. A coil component, comprising:

a body including a first end surface and a second end surface facing each other in a length direction, a first side surface and a second side surface facing each other in a width direction, and an upper surface and a lower surface facing each other in a thickness direction;

a coil portion disposed in the body; and first and second external electrodes disposed on the first and second end surfaces of the body, respectively, and connected to the coil portion in the length direction, wherein 2.4≥A/C≥6.4 and 1.6≥B/C≥5.0 are satisfied, where 'A' is a length of the coil component in the length direction, 'B' is a width of the coil component in the width direction, and 'C' is a thickness of the coil component in the thickness direction, the thickness (C) of the coil component being defined as a distance from a lowermost surface of the first and second external electrodes to the upper surface of the body, and a ratio of a thickness to a width of one turn of the coil portion is 1 or less, the thickness of the one turn being defined in the thickness direction of the body.

15. The coil component of claim 14, wherein the length (A) of the coil component is 1.2 mm or more and 3.2 mm or less.

16. The coil component of claim 14, wherein the width (B) of the coil component is 0.8 mm or more and 2.5 mm or less.

17. The coil component of claim 14, wherein the thickness (C) of the coil component is 0.5 mm.

18. The coil component of claim 14, wherein each turn of the coil portion includes a rectangular cross-sectional shape with corners each having a substantially right angle.

19. The coil component of claim 14, wherein each turn of the coil portion includes a rectangular cross-sectional shape with rounded corners.

20. The coil component of claim 14, wherein each turn of the coil portion has two side surfaces that are substantially flat.

* * * * *